US010949994B1

(12) United States Patent
Scheffler

(10) Patent No.: US 10,949,994 B1
(45) Date of Patent: Mar. 16, 2021

(54) DYNAMIC MARKER DEVICE FOR AUGMENTED AND MIXED REALITY AND METHOD OF USE

(71) Applicant: Thomas Byram Scheffler, Murrells Inlet, SC (US)

(72) Inventor: Thomas Byram Scheffler, Murrells Inlet, SC (US)

( * ) Notice: Subject to any disclaimer, the term of this patent is extended or adjusted under 35 U.S.C. 154(b) by 138 days.

(21) Appl. No.: 16/290,744

(22) Filed: Mar. 1, 2019

Related U.S. Application Data

(60) Provisional application No. 62/637,382, filed on Mar. 1, 2018.

(51) Int. Cl.
*G02B 27/01* (2006.01)
*G06T 7/73* (2017.01)

(52) U.S. Cl.
CPC .............. *G06T 7/73* (2017.01); *G02B 27/017* (2013.01); *G02B 2027/014* (2013.01); *G02B 2027/0138* (2013.01); *G06T 2207/30204* (2013.01)

(58) Field of Classification Search
None
See application file for complete search history.

(56) References Cited

U.S. PATENT DOCUMENTS

2006/0050087 A1* 3/2006 Tanimura .............. G06T 19/006 345/629
2020/0043211 A1* 2/2020 Bastide ................... G06F 3/012

* cited by examiner

*Primary Examiner* — Idowu O Osifade
(74) *Attorney, Agent, or Firm* — Graham Casanova Alig; Alig Patent Law

(57) ABSTRACT

The present invention comprises a novel modular trigger marker device generally consisting of at least two cylindrical elements, which are connected in a way that will allow the top element to turn independently from the bottom element to reveal multiple variations of the unique identifying image printed on the bottom cylindrical element(s).

20 Claims, 10 Drawing Sheets

Top View
Piece A

Top View
Piece B

Top View
Piece A

Top View
Piece B

Side View
Piece A

Piece B

Variations Top View
Piece B

Section View

DYNAMIC MARKER DEVICE FOR AUGMENTED AND MIXED REALITY AND METHOD OF USE

CROSS-REFERENCE TO RELATED PATENT APPLICATIONS

The present application claims the benefit under 35 U.S.C. § 119(e) of U.S. Provisional Application 62/637,382 filed on Mar. 1, 2018, the disclosure of which is incorporated herein by reference in its entirety.

FIELD OF INVENTION

This invention relates to the field of hyper-reality, including virtual reality, mixed reality and augmented reality and in particular to systems and methods which incorporate the use and presentation of marker elements.

BACKGROUND

The present industry uses Natural Feature Tracking markers (NFT), GPS markers, Object Markers, markerless (tracking) markers, multimarkers, and framemarkers to trigger an event through the camera that will then utilize augmented reality, virtual reality or mixed reality to engage with the user.

Recognition (or marker) based augmented reality is used by a camera to identify visual markers or objects, such as a QR/2D code or natural feature tracking (NFT) markers, to showcase an overlay only when the marker is sensed by the device. Marker-based AR technology depends upon device camera to distinguish a marker from other real-world objects.

The concept of using a marker in an augmented reality system is well-known. For instance, such marking systems are described as early as Apr. 3, 2003 in U.S. Patent Application 2003/0063132 to Sauer et al. Here the inventors describe the use of a single virtual mark for identification of a single structure in an augmented reality system. Various shapes for markers are considered by Sauer et al. however a plurality of markers is not disclosed or considered.

U.S. Patent Application 2007/0242886 to Ben St. John published on Oct. 18, 2007, discloses methods to determine to the position of a marker in either an augmented or virtual reality system. The application discloses methods for precisely determining the position of a marker. Also disclosed are methods for tracking the movement of a marker. Such methods are useful and helpful in an augmented reality system; however, the system is limited by the linking of a single object with a single marker.

U.S. Patent Application 2017/0231714 to Bartosz et al. published on Aug. 17, 2017, presents a method for guiding a user performing surgery using an augmented reality system. Here is a presented a system where augmented reality is used to assist with the placement of a surgical instrument during sinus surgery. Here a plurality of markers are disclosed; however, the markers themselves are virtual markers and are used to guide a user to a desired real-world placement of a surgical instrument. The application does not disclose the use of the real world markers to position a virtual object rather Bertosz et al. disclose the use of a single or plurality of virtual markers to assist in the positioning of a real-world object.

U.S. Patent Application 2017/0,124,765A1 to Kyosuke Imamura published on May 4, 2017, presents the use of a marker object to create an augmented reality or virtual reality experience. Imamura discloses, inter alia, a way to recognize a marker in a video frame and then recognize the presence of said marker in an earlier frame. This method is useful for continuity of display of augmented reality; however, Imamura's invention requires the use of a distinct and separate marker object to establish the presence of another virtual object.

U.S. Patent Application 2011/0134108A1 to David Hertenstein published on Jun. 9, 2011, discloses a system wherein the augmented reality item marker is encoded as a 2D image. This 2D augmented reality item marker can be quickly recognized by a computer-coupled image capturing device. Upon recognition, the augmented reality display can be updated with a virtual object in the same planer position as the item marker. The application to Hertenstein lacks the capability to quickly or rapidly change the item marker to code for a distinct and separate virtual object.

The aforementioned patent applications, U.S. Patent Application 2003/0063132 to Sauer et al. published on Apr. 3, 2003, U.S. Patent Application 2007/0242886 to Ben St. John published on Oct. 18, 2007, U.S. Patent Application 2017/0231714 to Bartosz et al. published on Aug. 17, 2017, U.S. Patent Application 2017/0124765A1 to Kyosuke Imamura published on May 4, 2017 and U.S. Patent Application 2011/0134108A1 to David Hertenstein published on Jun. 9, 2011 are hereby incorporated by reference in their entireties.

A commercial attempt to improve on augmented reality marker is The Merge Cube (see mergevr.com/cube). This device aims to improve on the single image. The device is a cube with unique images on the outside of the cube. These images act as the triggers for augmented reality, mixed reality and/or virtual reality events. By rotating the face of the cube-shaped device to display a distinct marker element to the image capture device, this marker system is able to provide the user with a plurality of distinct marker elements. However, this device does not have the dynamic ability of being able to offer more unique images than that which is imprinted on each face of the device, i.e. six images in the cube form. In order to have more trackable marker elements the device would need more faces, e.g octahedron, or multiple objects would be needed. Although this design allows for a plurality of marker elements it is clearly limited in its dynamic range.

The drawback to these types of markers is the necessity to have multiple markers created to hold the capabilities of triggering a single event each. If someone wanted a dozen 3D models of their favorite sports players to be viewed in augmented reality, they would need a dozen of unique identifying images printed out to hold a sports player each.

It is known that Augmented Reality (hereinafter, referred to as "AR"), Mixed Reality (hereinafter, referred to as "MR" and virtual reality (hereinafter, referred to as "VR") can be marked with static images. Such markers include QR codes/2D codes or unique logos printed or displayed somewhere on flat surfaces. Geometrically shaped objects with additional printed static QR codes/2D codes can also be used as markers. These types of markers limit the diversity of augmented reality to be developed as the number of unique images is limited to the single images created.

This lack of dynamic marker ability is causing a hindrance in the adoption rate of marker-based augmented reality for many industries. It would be desirable to have a dynamic and unlimited source of markers to allow the marking of nearly every image imaginable.

Here is presented a device that is capable of dynamically creating a plurality of marks each uniquely identifiable in an augmented reality environment.

BRIEF SUMMARY OF THE INVENTION

Herein is presented a computer-generated perceptual information marking device comprising, at least two substantially flat layers, a first layer and a second layer. The first layer having a front side and a back side, the front side being imprinted with a plurality of design elements, wherein the design elements are individually recognizable by a video-enabled computer machine. The second layer having a front side and a back side and constructed to be opaque to the video-enabled computer machine. Wherein the second layer is movably attached to the front side of first layer, and configured to prevent at least one design element imprinted on the front side of the first layer from being recognized by the video-enabled computer machine. Wherein moving the orientation of the first layer and the second layer, permits the at least one design element imprinted on the front side of the first layer to be recognized by the video-enabled computer machine.

Preferably, the first and second layer of the embodiment are rotationally attached through a single point that may be about centered or otherwise intentionally off-center. Also more preferred is an embodiment, wherein the mobile attachment of the first layer and second layer is a longitudinal attachment which permits sliding of the second layer over the first layer. More preferably the second layer is constructed of tiles supported on a grid, where each tile is movably attached to the grid. In another preferred embodiment, the first and second layer are hinged. More preferably the hinged layers are either co-planer or constructed of two intersecting planes. In yet another preferred embodiment, a portion of the second layer is removable, such that removing said portion of the second layer changes the presented design element.

In a more preferred embodiment, the back side of the first and/or second layer is imprinted with at least one design element.

In another embodiment, a method of creating a marked object in a hyper-reality system is presented. This method comprises providing a computer-generated perceptual information marking device which further comprises at least two substantially flat layers, a first layer and a second layer. The first layer having a front side and a back side, the front side being imprinted with a plurality of design elements, wherein the design elements are individually recognizable by a video-enabled computer machine. The second layer having a front side and a back side and constructed to be opaque to the video-enabled computer machine, wherein the second layer is mobily attached to the front side of the first layer, and configured to prevent at least one design element imprinted on the front side of the first layer from being recognized by the video-enabled computer machine. Wherein moving the orientation of the first layer and the second layer permits the at least one design element imprinted on the front side of the first layer to be recognized by the video-enabled computer machine. Presenting the computer-generated perceptual information marking device to a hyper-reality system which is configured present a user with a hyper-reality experience and is further configured to recognize the design elements of the computer-generated perceptual information marking device. Moving a layer of the computer-generated perceptual information marking device to change the presented design elements, wherein the changed presented designed elements are recognized by the hyper-reality system as a distinct design element.

Preferably, this embodiment allows the user to rotate at least one layer of the computer-generated perceptual information marking device to change the presented design elements.

Also preferably, this embodiment allows the user to slide at least one layer of the computer-generated perceptual information marking device to change the presented design elements.

Still also preferably, this embodiment allows the user to remove at least a portion of one layer of the computer-generated perceptual information marking device to change the presented design elements.

Also preferred, is an embodiment of the invention comprising spring-loaded elements or at least one 3D element on the first layer.

DETAILED DESCRIPTION AND BEST MODE OF IMPLEMENTATION

Figure 1:
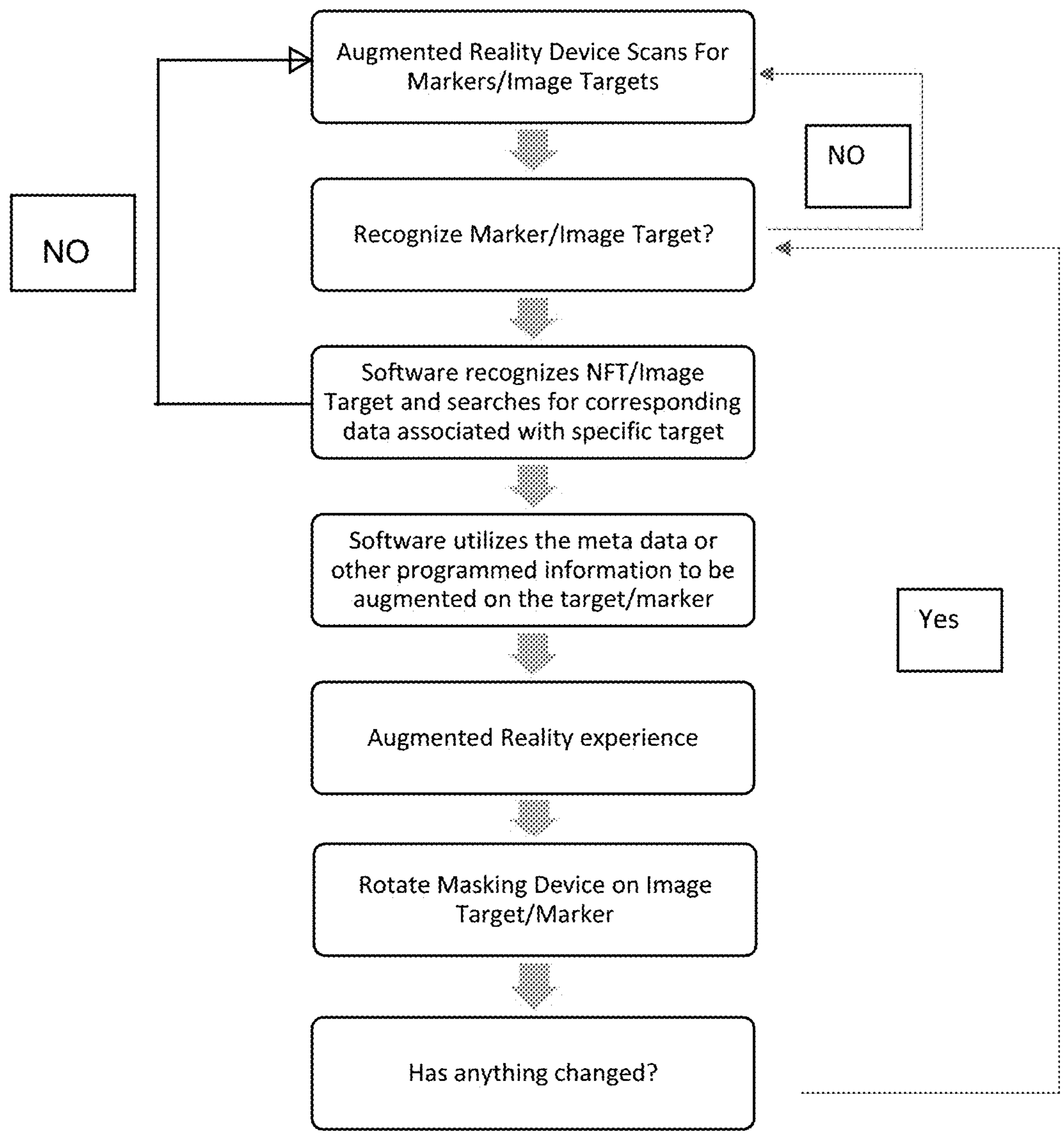
FIG. 1. presents a flow chart which depicts the use of the device in practice.

The Modular Trigger Marker ("device") is a new form of a marker that will allow the industry to have multiple ways of storing information from within the same individual marker device. The device will have unique identifying images on a layer(s) of the device, but the device will have a layer(s) on top of the unique identifying image(s) that will obscure sections of the markers unique identifying image(s). The top element will have cutout viewports of varying shapes and sizes that will allow the unique identifying image(s) below to be viewed from the top, or from any advantageous angle that will trigger an event. The user will then be able to turn the top layer(s), like a dial or pinwheel, to offer multiple unique identifying images all from within the same device. This will offer the Augmented Reality and Mixed Reality industries a new individual marker that can now be utilized for multiple purposes and applications of use.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the industry to which this invention belongs. It will be further understood that terms, such as those defined in commonly used dictionaries, should be interpreted as having a meaning that is consistent with their meaning in the context of the relevant industry and the present disclosure and will not be interpreted in an idealized or overly formal sense unless expressly so defined herein.

The term "hyper-reality", as used herein, means a computer-generated experience for a user which supplements the user's perception of reality, as in virtual reality, augmented reality or mixed reality or completed supplant the user's perception with a new reality, as in virtual reality. The terms hyper-reality, virtual reality, augmented reality and mixed reality are used interchangeably herein and are not limiting from one term to another term unless one or more of the term is excluded in the context of that paragraph, figure, section or claim.

Hyper-reality systems are well known the art in such forms as virtual reality, augmented reality and mixed reality. Hyper-reality systems used in combination with target images are as well-known and understood in the art. For example such systems are described in U.S. Patent Publication 2012/0092507, published on Apr. 19, 2012, entitled, "User Equipment, Augmented Reality (AR) Management Server, and Method for Generating AR Tag Information" to Ho Ryong Jung et al. Another example of an augmented reality system using an image target can be found within U.S. Patent Publication 2013/0135295, published on May 30, 2013, entitled, "Method And System for a Augmented Reality" to Ke-chun Li et al. Further examples of the use of augmented reality and image targets can be found U.S. Patent Publication 2014/0267403 published on Sep. 18, 2014 entitled "Methods and Apparatus for Augmented Reality Target Detection" to Maciocci Giuliano et al., U.S. Patent Publication 2015/0109480 published on Apr. 23, 2015 entitled, "Augmented Reality System and Method Using a Single Marker" to Ren-Chiun Wang, U.S. Patent Publication 2018/0182171 published on Jun. 28, 2018 entitled, "Systems and Methods for Real-time Multimedia Augmented Reality" to Heather Lipner and U.S. Patent Publication 2019/0005636 published on Jan. 3, 2019, entitled, "Methods and Systems for Operating an Apparatus Through Augmented Reality" to Jingwen Dai. U.S. Patent Publication 2012/0092507, published on Apr. 19, 2012, U.S. Patent Publication 2013/0135295, published on May 30, 2013, U.S. Patent Publication 2014/0267403 published on Sep. 18, 2014, Maciocci Giuliano et al., U.S. Patent Publication 2015/0109480 published on Apr. 23, 2015, U.S. Patent Publication 2018/0182171 published on Jun. 28, 2018 and U.S. Patent Publication 2019/0005636 published on Jan. 3, 2019 are all hereby incorporated by reference in their entireties.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New augmented and mixed reality markers, devices, apparatuses, and methods for triggering augmented and mixed reality events are discussed herein. In the following description, for purposes of explanation, numerous specific details are set forth in order to provide a thorough understanding of the present invention. It will be evident, however, to one skilled in the industry that the present invention may be practiced without these specific details.

The present disclosure is to be considered as an exemplification of the invention, and is not intended to limit the invention to the specific embodiments illustrated by the figures or description below.

Although both a device and method of use are described, immediately is presented a description of the use of the device. Such is provided not only convey the method of use but also the particulars of the device will become apparent as its use is described.

Figure 2:
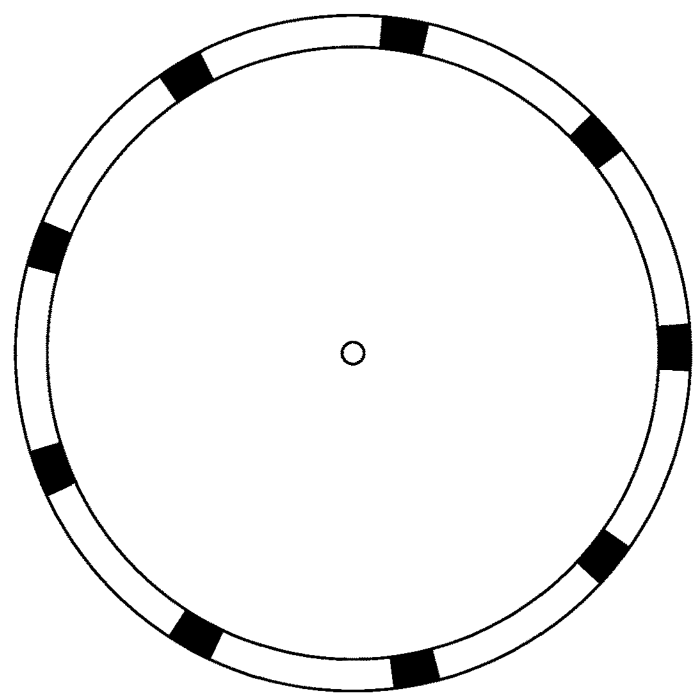
FIG. 2. shows an exploded view of a preferred embodiment of the device. This variation uses two disk elements that are connected at the center of the elements. Piece A shows a raised perimeter with grooves in the raised perimeter to allow for Piece B to rotate on until it catches in the grooves carved into Piece A.
Figure 2:
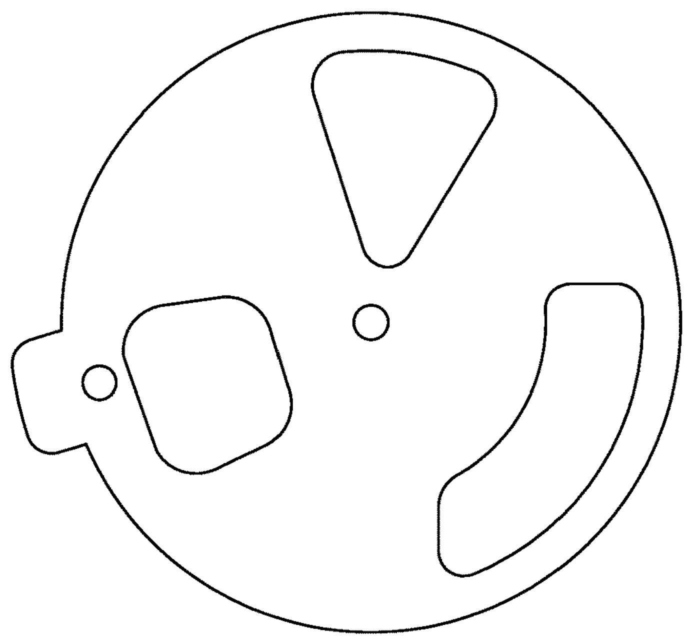
Figure 3:
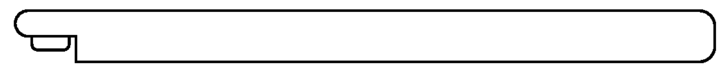
FIG. 3 illustrates the side view of a preferred embodiment of the device. Piece A is seen with grooves in the raised perimeter which would allow for Piece B to catch itself and set itself into these settings with its stopper, as seen on Piece B in the side view.

Referring to the flowchart on FIG. 1, the practice of the method requires the use of the device of the invention as described herein. This includes the use of an embodiment specifically conveyed herein or otherwise apparent to one skilled in the art based on the disclosure herein. Although for this description of the flowchart of FIG. 1 the invention is presented as shown in FIG. 2. A computational device capable of recognizing a marker and/or image target also required for the practice of the method. Such devices are well known in the industry, see the first paragraph of the Detailed Description. It is important to program the computational with a list of the corresponding known targets with additional data associated with said known targets or allow the computational device access to a database with such information. This information is capable of conveying to a display system the details necessary to present a user with a hyper-reality experience. Such hyper-reality experience may be in the form of augmented reality, enhanced reality or virtual reality. A plurality of known markers and/or image targets is supplied to the computational device directly in the computational device's memory or in a database to which the computational device has access.

The initial step as presented in FIG. 1 is wherein the augmented reality device scans for markers or image targets.

Here is the initial starting sequence for the use of the device also serves for it is the initial start sequence for any algorithm controlling the use of the computational device that could be created to govern such use. Visual information is uploaded to a computing device for the purpose of scanning the environment for a potential marker and or image Target. The image is conveyed to a computational device capable of recognizing such markers or image targets. Such capabilities are implemented through software. Such software is well understood in the field, the first paragraph of the Detailed Description. Any software capable of recognizing a marker and/ or image target can be used with the invention as described herein. Once the image has been interpreted and analyzed by the computational device, the computational device will return either an indication of a positive encounter with a marker or target or a negative indication of lack of a marker and/or target in the image conveyed. In the event of a negative indication, the routine begins again with the initial step. In this event, the routine starts over and it begins image capture for the present for determination of the presence of a marker and/or an image target.

In the event of a positive recognition of a marker and/or image target the routine moves on to step 3. Step 3 is a search of the aforementioned supplied database for a corresponding known target and/or marker with associated data.

As shown in the fourth box from the top of the flowchart of FIG. 1, once the identified marker and/or image target is paired with a specific file of data contained within the supplied database the software now uses the metadata or and or other programmed information to formulate the collection of sensory information to be presented to the augmented reality display in the following step.

As shown in the fifth box from the top of the flowchart of FIG. 1, specific sensory information is now conveyed to the user in order to create a hyper-reality experience for said user. Such hyper-reality experience can be but is not limited to visual information, auditory information, sensory information, or otherwise hyper-reality experiential information capable of being presented by the hyper-reality machine.

Moving to the next step in the flowchart as depicted in FIG. 1, the sixth box from the top, while the user is engaged in a hyper-reality experience, the user is free to rotate or otherwise manipulate the device such that the image on the device is changed. Such an action, therefore, creates a new marker and/or target that can be recognized by the computational device. Wherein the image of said new target and or marker is conveyed to said computational device.

In the final step of the flowchart as presented in FIG. 1, the image is conveyed to the computational device so that any changes can be recognized and a new routine is started otherwise the method remains at this position repeatedly scanning for potential changes.

If the device has been rotated and the first target image has been replaced with a new target image the routine returns to the second box from the top and determines if the new target image can be recognized.

FIG. 2 represented a preferred and exemplary embodiment of the invention. FIG. 2 depicts an exploded perspective view of the elements that may comprise a modular trigger marker (the "device") for augmented reality and/or mixed reality according to various embodiments of the present invention. In preferred embodiments, there will be at least two elements of the body of the device, but not limited to only two, that could be cylindrical in shape, or any other shape that fits the needs, with a circumference or size that can vary in accordance with the needs of the end user and the application of the device to meet those needs. The two, or more, cylindrical elements could be attached to each other in a way that allows for the elements to spin, rotate, or turn independently of themselves. At least one element will have a unique identifying image(s) printed, painted, or any other form of marking or placing the unique identifying image(s) on the element in order to interact with an augmented or mixed reality enabled device and camera. The additional element(s) that may be layered above the unique identifying image(s) could have holes, shapes, and/or patterns cut out from the layered elements in order to act as an obstruction to the entire unique identifying image(s). These cut out viewports along with the ability to rotate the elements independently, will allow for the creation of multiple unique identifying images all from within a single Augmented Reality and Mixed Reality marker. This ability to change unique identifying images instantly will allow for a single modular trigger marker to house multiple interactions and engagements with a capable device.

This variation uses two disk elements that are connected at the center of the elements. Piece A shows a raised perimeter with grooves in the raised perimeter to allow for Piece B to rotate on until it catches in the grooves carved into Piece A. This allows for the device to have preset stopping points, or settings, for the device to accurately maintain a consistent unique identifying image. Notice the cutout viewports in Piece B can vary from these shapes, patterns, and designs from device to device, in order to create the ability of unlimited unique identifying image(s) creation.

One variation to creating this device is as follows. The bottom element with the unique identifying image(s) could have a raised border on the perimeter. The raised border could contain grooves on, but not limited to, the top of the element that would act as stopping points for the second cylindrical element to be connected on top with an attached stopper that would be caught in these grooves when the top element is turned into the correct positions. This would all follow the same process with a similar design of a cylindrical bottom element with grooves on the outside side or inside side perimeter of the element allowing for the top cylindrical element to guide it's attached stopper into each stopping point when the top element is turned. The distance between stopping points, grooves, can vary depending on the needs and application of the use of the modular trigger marker. A device could have one stopping point, up to an infinite amount of stopping points as the device size would permit without compromising functionality. The bottom cylindrical element will also have a unique identifying image, shape, pattern, code, letter, number, or any combination of the mentioned examples above, printed on to the element as seen in FIG. 2.

It should be understood that in most embodiments the first target image is obscured from any viewing position when the device is manipulated to reveal a second target image. Likewise, restoration of the first target image similarly obscures the second target image. This is true for any embodiment with n number of target images, manipulation of the device to reveal a different target image results in the complete obfuscation of the instant target image. This is different from the existing state of the art of multiple target image devices wherein the first image is merely turned away from the image capture device and a second independent target image is presented to the image capture device.

One variation for connecting the elements together in a preferred embodiment is as follows. The top cylindrical element could be connected to the bottom cylindrical element at the center of the cylindrical shape, allowing for the top element to be turned like a pinwheel or prize wheel. The top element could also contain a stopper element that would fall into the grooves, as described in the two paragraphs above, with the bottom cylindrical element, allowing for the top element to have predetermined stopping points along its turning radius. The top cylindrical element could also have shapes and/or patterns cut out of the element, viewports, in varying sizes and frequency, to allow for the unique identifying image, as described in the previous paragraph, to be viewed from the top and recognized by an augmented reality or mixed reality capable device. The top element may also have a single circular cutout viewport to display the number labeled groove setting the stopper is currently stopped in.

The completed modular trigger marker device could comprise of the two cylindrical elements, bottom and top, joined together at the center, to allow for a spinning or turning motion, to allow the top cylindrical element to show the unique identifying image beneath it, through the various cutout viewports, with the new ability of offering multiple unique identifying patterns from one single marker for an augmented or mixed reality enabled device to scan, register, and react to.

While the preferred embodiment is described above as having two cylindrical elements it could also be made with, but not limited to, an additional cylindrical layer which would enable more opportunities to create multiple variations of the unique identifying image through the various viewports and images that could be printed on the additional cylindrical layer.

While preferred materials for elements would be plastic, the device is not limited by these materials. Wood, rubber, foam, metal alloys, aluminum, and other materials may comprise some or all of the elements of the modular trigger marker device and apparatuses in various embodiments of the present invention.

Although the present invention has been illustrated and described herein with reference to preferred embodiments and specific examples thereof, it will be readily apparent to those of ordinary skill in the industry that other embodiments and examples may perform similar functions and/or achieve like results. All such equivalent embodiments and examples are within the spirit and scope of the present invention, are contemplated thereby, and are intended to be covered by the following claims.

Figure 4:
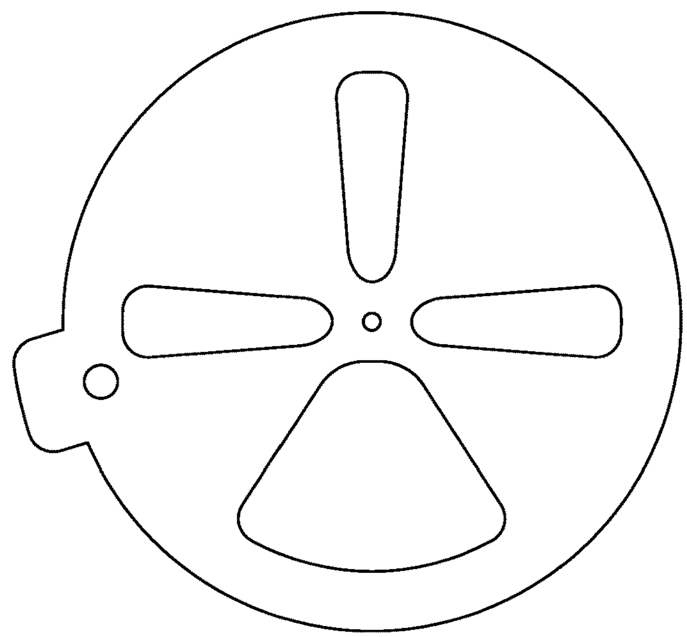
FIG. 4. presents two variations, of many possible variations, of the top elements with the viewports cut out from the elements.
Figure 4:
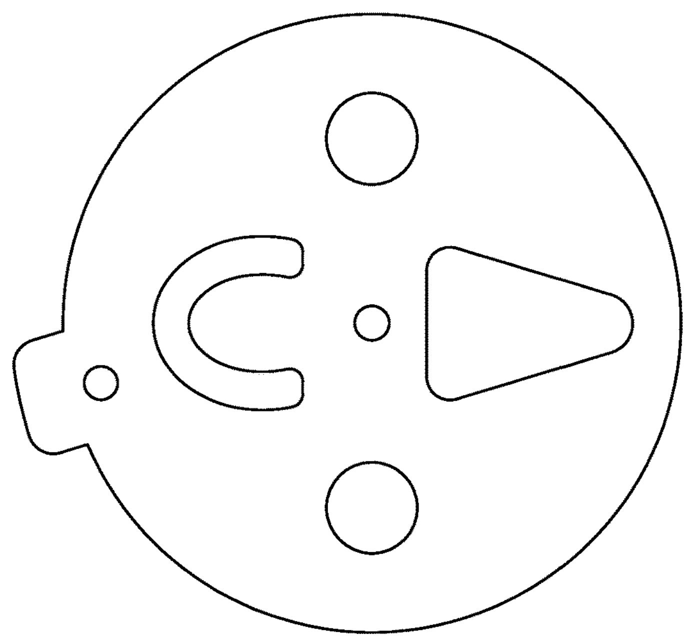

Another embodiment of the present invention can be practiced using this device with obscuring the element(s) below, with the unique identifying image(s), by using a series of sliding pieces that will allow new unique identifying images to appear. Referring to FIG. 4, this is a similar concept to the previously described embodiment; however, instead of using rotational elements this embodiment it enables sliding elements. Such a sliding element which is easily conceptualized as similar to a sliding door or sliding block logic game. The advantage to this embodiment is the unique way of creating various unique identifying images in a medium that suits sliding elements over a spinning dial to achieve the same results.

This embodiment can be practiced using this device with obscuring element(s) below, with the unique identifying image(s), by using a series of lights shining through the bottom element, which could be visible to the naked eye or not (ex. Infrared), and elements that will obscure the lights in a way to create a new unique identifying image that will appear. This is a similar concept to the previously described embodiments, however, to change the marker presented this embodiment uses lights with obscuring elements, which are of a similar concept to the dial like the design and the sliding door design. This will allow for an embodiment to be used in low light situations.

It is understood that another embodiment of the present invention can be practiced using this device with obscuring the element(s) below, with the unique identifying image(s), by using flipping elements that when left open, will provide the user with a new unique identifying image. This is understood to be similar to a shutter on a house, or standard doors opening and closing on a building.

In another embodiment, changing the marker element does not require a moving part. In this embodiment, the invention is practiced using this device with obscuring the element(s) below, with the unique identifying image(s), created by the display screen. In this embodiment, the display is altered by a software program, such as an object-oriented programing language, with programmed elements that will be of a similar concept to other embodiment, wherein a plurality of marker elements can be presented.

EXAMPLES

Example 1: Disc Prototype:

One prototype that embodies the capabilities of the invention is the circular disc. This embodiment is comprised of, but not limited to, two circular elements that are connected in the center by a fastener that allows them to spin independently of each other. The top element has additional holes cut out of it, in order to allow for the information printed on the element below it to be revealed. This prototype has the ability to hold numerous triggered events depending on the complexity of the design, and the additional masking elements added to the prototype. These disc prototypes will be used as, but not limited to, marketing and advertising, educational, entertainment, and security tools.

In constructing this prototype, the materials used were two heavy weight cardstock discs and a Chicago screw fastener in the middle. The cardstock is printed and die cut to resemble the described appearance and utility as explained above. This prototype could have been created using alternative material such as, but not limited to, plastic, rubber, wood, and glass.

Using FIG. 2, as an example of the invention, piece A is placed on top of piece B, and both pieces are connected in the center by piece C. Piece A illustrates the revealing holes that are designed to show the bottom piece B designs to the end user, when placed over piece B. Piece B The center connecting piece C is utilized to allow the two pieces, A and B, to be connected together in a way that allows them to be able to spin independently of each other.

Example 2: Slider Example

Figure 5:
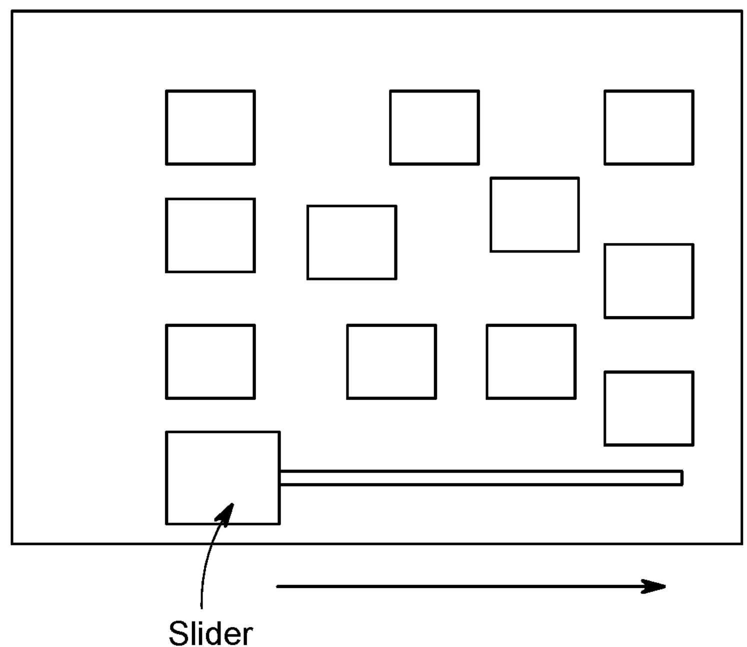
FIG. 5 presents a drawing of an embodiment of the invention with sliding tiles.
Figure 5:
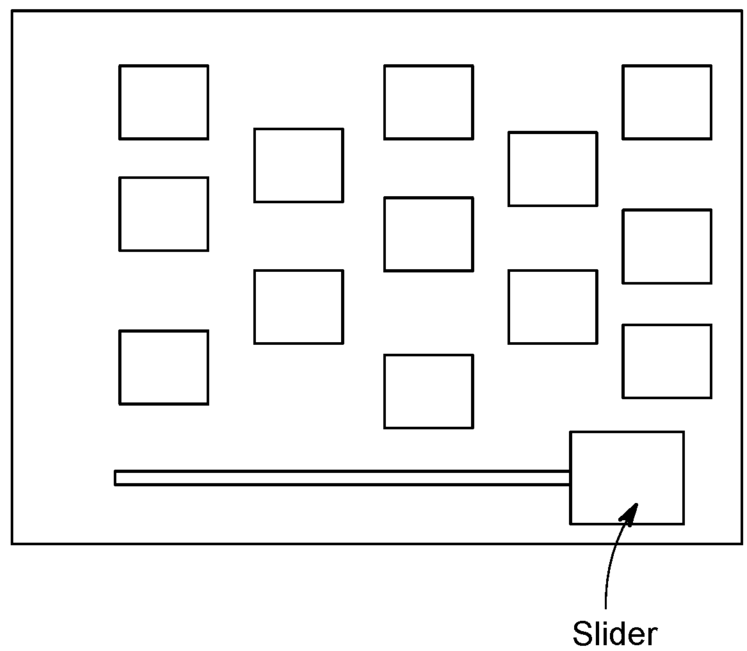

Referring to FIG. 5, here is presented another embodiment of the invention. The overall concept of the invention is maintained, a device is presented has an image that can be used as a marker and/or target in a hyper-reality system and this image is capable of being manipulated to alter the first image and create a second image that can be used as a marker and/or target in a hyper-reality system. As presented in FIG. 5, the device is constructed of tiles supported on a grid, where each tile is movably attached to the grid. The moving of any one tile alters the image and creates a second image which is capable of being recognized by the hyper-reality system. Such a configuration as presented in FIG. 5 is simple to manipulate to create a second position that recognizable by the hyper-reality system wherein it is equally simple to restore the first image such that it is once again recognizable by the hyper-reality system. The simple sliding of a tile from one position to another alters the image enough so that the hyper-reality system can recognize each image as a distinct marker and/or target. It is understood that the design of the invention presented in FIG. 5 may also contain notches such the tile are inclined to lock into specific positions. This helps the user reestablish the desired image.

Example 3: Two-Sided Embodiment

Figure 6:
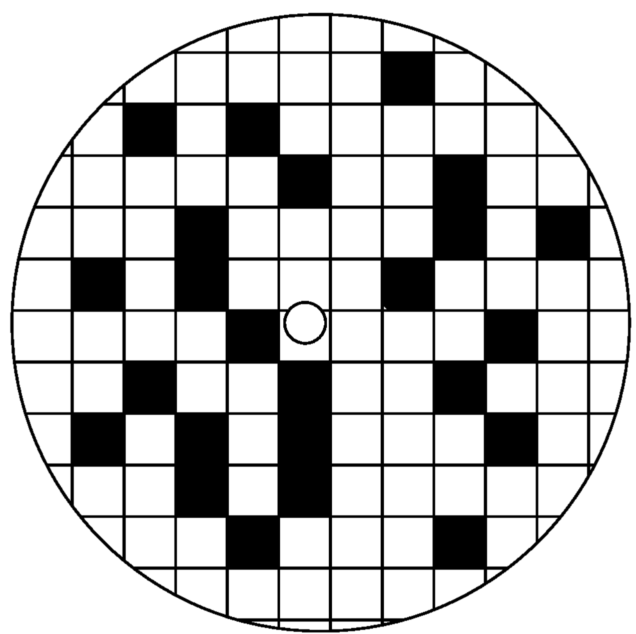
FIG. 6 presents a drawing the face of the first layer of the invention as a separate part.
Figure 7:
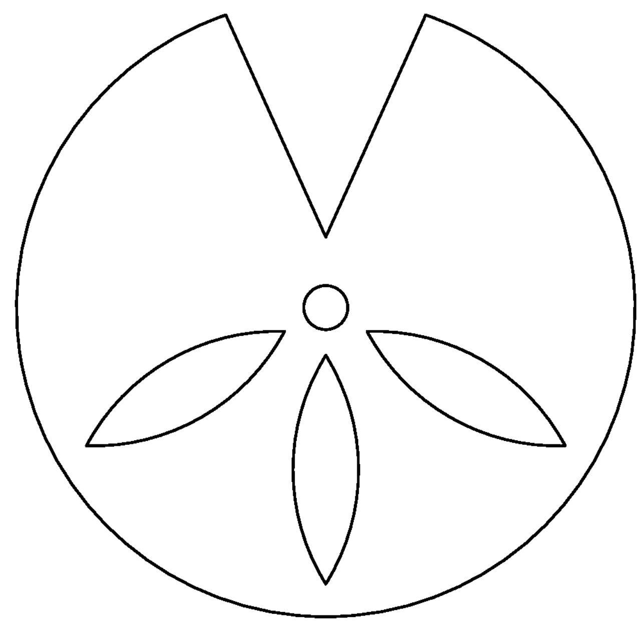
FIG. 7 depicts a drawing of the second layer of an embodiment of the invention as a separate part.
Figure 8:
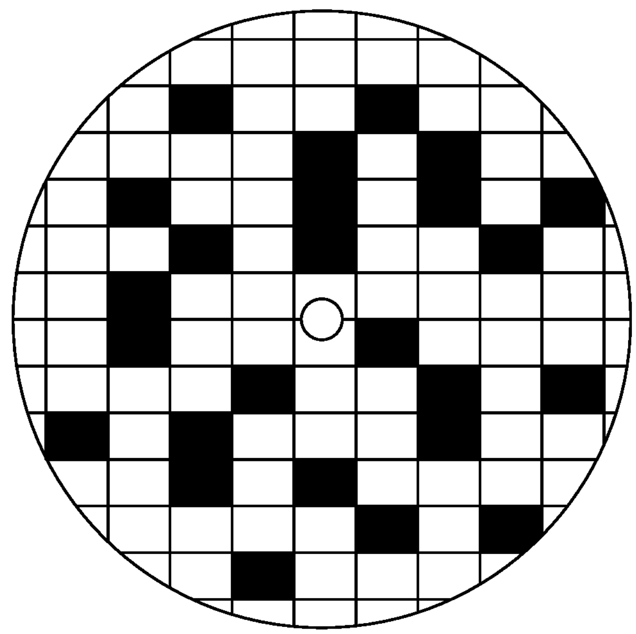
FIG. 8 presents a drawing the bottom of the first layer of the invention.

Referring to FIGS. 6, 7, 8 and 9, here is present a similar presentation of the invention as shown in Example 1. Like Example 1, this example comprises two generally flat discs approximately palm-sized. The first disc layer is a shallow cylinder with imprinting. As shown in FIG. 6 and FIG. 8 the disc has imprinted on the front face (see the top of FIG. 6) as well as the bottom face (top of FIG. 7). As shown in the FIG. 7 the second disc layer is a shallow cylinder of approximately the same size as the first disc layer. As is apparent FIG. 7 and FIG. 9, the second disc layer has a plurality of cut-out on a solid, mostly-opaque face which lack any imprinting, writing, pictures or adornment.

Figure 9:
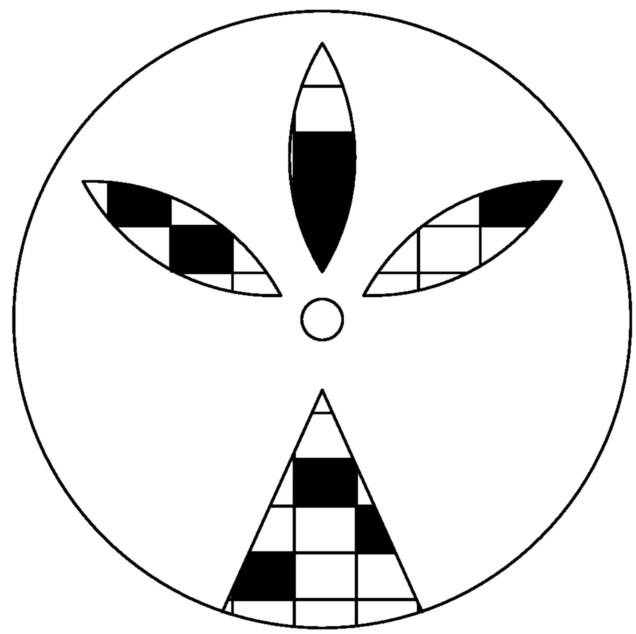
FIG. 9 depicts an embodiment of the invention wherein the second layer is configured on top of the face of the first layer.

As shown in FIG. 9, the second layer can be attached concentrically to the top of the face side of the first layer. When positioned this way the second layer generally obscures the imprinting on the face side of the first layer, except for where the cut out portions are positioned. The cutouts do not obscure the imprinting at all, enough of the design on the face of the first layer is apparent through the cutout that it can be used as an image target in an augmented reality system. As shown in FIG. 9 the two discs are attached by a single concentric attachment and are free to rotate.

When the device is positioned as depicted in the configuration of the FIG. 9 and its top face is captured by an image capturing device, the design is recognized by the computational device and compared to a given database of target images. The computational device is now able to use the associated file linked to the target image in the database to direct an augmented reality system to replace the image of the device with an image or other sensory information in the augmented reality display. Thereby giving the user an augmented reality experience.

The configuration of FIG. 9 permits the second layer to be rotated on the face of the first layer. When the user rotates the second layer the portion of the imprinting of the face of the first layer visible through the cutout of the second layer changes. The first image target is not obscured. Yet a second image target is visible. This rotation permits a second image target to be captured by the image capture device. The second image target is now sent to the computational device for analysis. The second image target is recognized by the computational device. Then computational device compares the second image target to the database and locates the file associated with the second image device. Now the computational device transfers the files to the augmented reality display. The augmented reality display now replaces the device with the images associated with the image target in the database so that the user sees the expected images instead of the device.

This example of the invention has imprinting on the backside of the first layer so when the device is turned over another image target is captured by the image capture device, see FIG. 8. This third image target is static and in this example cannot be transformed into another image target. When the image capture device captures the image target this image is sent to the computational device which recognizes the image target and compare it to the database to locate the associated file. These associated files are transferred to the augmented reality system so that the image of the device is replaced with the image associated with the third image target.

Example 4: 3D Embodiments

Figure 10:
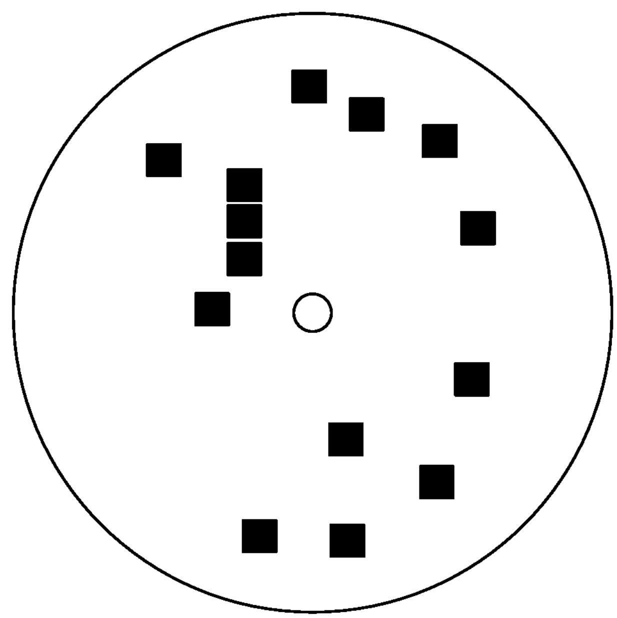
FIG. 10 presents the first layer of an embodiment of the invention which features spring-loaded tiles on the face of the first layer.
Figure 11:
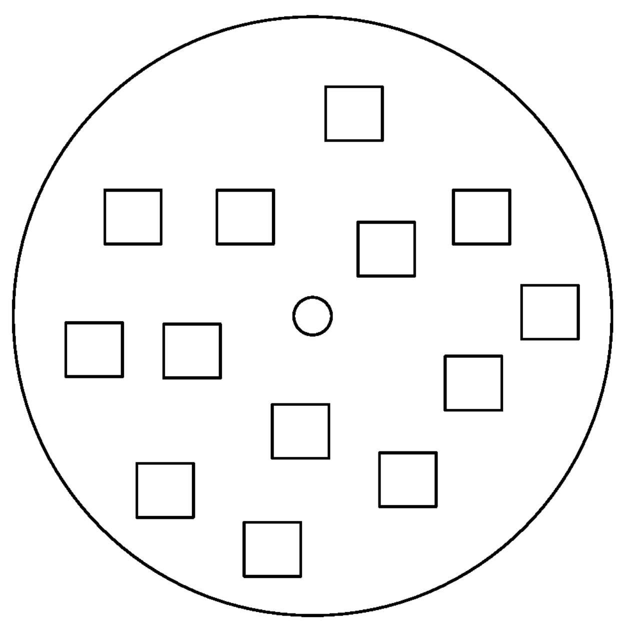
FIG. 11 presents the second layer of an embodiment of the invention. The second layer has cutout portions of the layer as depicted.

Referring to FIGS. 10, 11, 12, 13 and 14, here is presented another example of the invention. FIG. 10 shows the first layer of the device it is shaped like a shallow cylinder approximately palm-sized. The first layer is configured with spring loaded tiles of uniform size. The tiles are colored, whereas the surface of the first layer is not colored creating a contrast. The second layer as shown in FIG. 11 is a shallow cylinder. This layer is generally opaque. The second layer has cut-out distributed over its surface. The cutouts are slightly larger than the spring-loaded tiles of the first layer.

Figure 12:
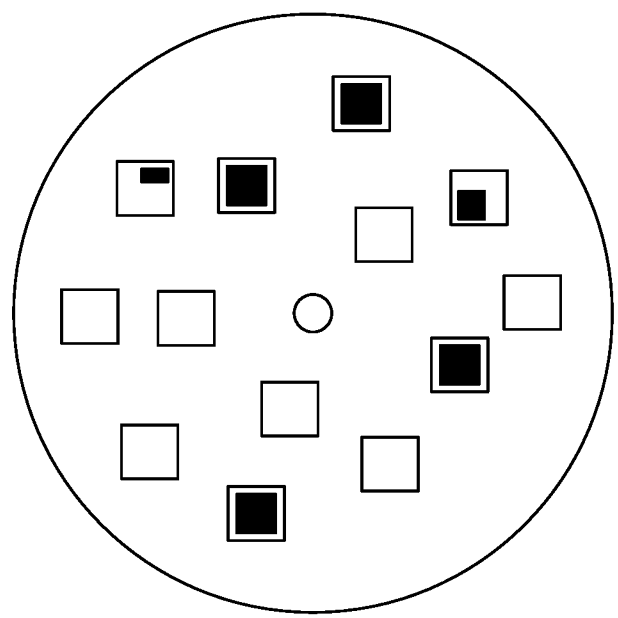
FIG. 12 depicts the embodiment of the invention wherein the second layer is attached to the face of the first layer. The cutouts of the second layer permit some of the tiles of the first layer to pop through the face of the second layer.
Figure 13:
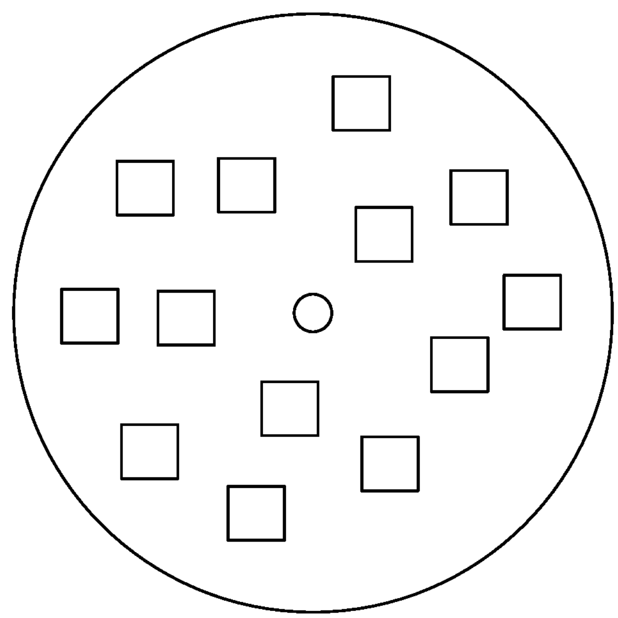
FIG. 13 depicts the embodiment of the invention wherein the second layer is attached to the face of the first layer. In this view, the second layer is configured to obscure all the tiles of the first layer.

FIG. 12 shows the second layer attached rotational and concentrically to the face of the first layer. It is shown in a configuration, wherein some of the cutouts align with the spring loaded tiles permitting them to pop through the cutout and be visible. Other tiles are completely obscured by the second layer. Still, other tiles are partially blocked by the second layer so that cannot pop up by a portion thereof is still visible. This configuration creates a target image that is identified by an augmented reality system consisting of an image capture device, a computational device, a database of image targets and associated filed and an augmented reality display system. When the image target is recognized by the system the image of the device can be replaced by the desired image as described previously.

The user can depress the popped tiles and allow the device to rotate. Rotating the device can obscure the image target. In this example there is a configuration when no image target is visible, see FIG. 13. However, there are a plurality of possible image targets this example, as can be understood by comparing FIGS. 10 and 11. Each position in which a tile pops fully through a cutout is a unique and identifiable target image. These target images are stored in the database and associated with augmented reality images and graphics.

Figure 14:
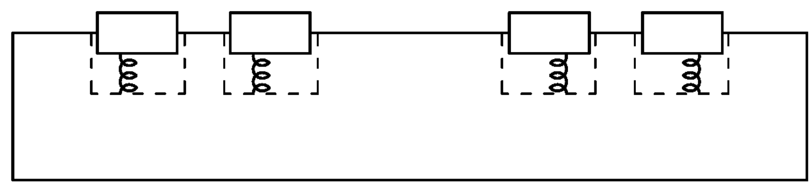
FIG. 14 is a side view cross-section of an embodiment of the invention depicting the spring-loaded mechanism of the tiles.

FIG. 14 show the example from the side view, as a cross section cut away. In FIG. 14 the spring-loaded mechanism of the tiles is apparent. IT should be easily understood how the tiles could pop through the cutouts of the second layer.

I claim:

1. A computer-generated perceptual information marking device comprising:

At least two substantially flat layers, a first layer and a second layer;

The first layer having a front side and a back side, the front side being imprinted with a plurality of design elements, wherein the design elements are individually recognizable by a video-enabled computer machine;

The second layer having a front side and a back side and constructed to be opaque to the video-enabled computer machine, wherein the second layer is mobily attached to the front side of first layer, and configured to prevent at least one design element imprinted on the front side of the first layer from being recognized by the video-enabled computer machine;

Wherein moving the orientation of the first layer and the second layer, permits the at least one design element imprinted on the front side of the first layer to be recognized by the video-enabled computer machine.

2. The computer-generated perceptual information marking device of claim 1, wherein the mobile attachment of the first layer and second layer is a rotational attachment.

3. The computer-generated perceptual information marking device of claim 2, wherein the rotational attachment is in the center of each layer.

4. The computer-generated perceptual information marking device of claim 2, wherein the rotational attachment is non-centered in at least one layer.

5. The computer-generated perceptual information marking device of claim 1, wherein the mobile attachment of the first layer and second layer is a longitudinal attachment which permits sliding of the second layer over the first layer.

6. The computer-generated perceptual information marking device of claim 5, wherein the second layer is constructed of tiles supported on a grid, where each tile is movably attached to the grid.

7. The computer-generated perceptual information marking device of claim 1, wherein the longitudinal attachment is hinged.

8. The computer-generated perceptual information marking device of claim 7, wherein the first layer and second layer are co-planer.

9. The computer-generated perceptual information marking device of claim 1, wherein the planes of first layer and second layer intersect.

10. The computer-generated perceptual information marking device of claim 1, wherein the mobile attachment of the first layer and second layer is a detachable portion of the second layer.

11. The computer-generated perceptual information marking device of claim 1, wherein the mobile attachment of the first layer and second layer is a foldable portion of the second layer.

12. The computer-generated perceptual information marking device of claim 11, wherein the back side of the second layer is imprinted with at least one design element.

13. The computer-generated perceptual information marking device of claim 1, wherein the back-side of the first layer is imprinted with at least one design element.

14. The computer-generated perceptual information marking device of claim 13, wherein the back-side of the second layer is imprinted with at least one design element.

15. The computer-generated perceptual information marking device of claim 1, wherein moving the orientation of the first layer and the second layer, permits the at least one design element imprinted on the back side of the second layer to be recognized by the video-enabled computer machine, wherein said at least one design element imprinted on the back side of the second layer was not recognizable in the initial configuration.

16. The computer-generated perceptual information marking device of claim 15, further comprising a video-enabled computer machine capable of recognizing at least one design element imprinted on a surface.

17. A method of creating a marked object in a hyper-reality system comprising (a) Providing a computer-generated perceptual information marking device which comprises:

At least two substantially flat layers, a first layer and a second layer;

The first layer having a front side and a back side, the front side being imprinted with a plurality of design elements, wherein the design elements are individually recognizable by a video-enabled computer machine;

The second layer having a front side and a back side and constructed to be opaque to the video-enabled computer machine, wherein the second layer is mobily attached to the front side of the first layer, and configured to prevent at least one design element imprinted on the front side of the first layer from being recognized by the video-enabled computer machine;

Wherein moving the orientation of the first layer and the second layer, permits the at least one design element imprinted on the front side of the first layer to be recognized by the video-enabled computer machine;

(b) Presenting the computer-generated perceptual information marking device to a hyper-reality system which is configured present a user with a hyper-reality experience and is further configured to recognize the design elements of the computer-generated perceptual information marking device;

(c) Moving a layer of the computer-generated perceptual information marking device to change the presented design elements, wherein the changed presented designed elements are recognized by the hyper-reality system as a distinct design element.

18. The method of claim 17, where the at least one layer of the computer-generated perceptual information marking device is rotated to change the presented design elements.

19. The method of claim 17, where the at least one layer of the computer-generated perceptual information marking device is slid to change the presented design elements.

20. The method of claim 17, where the at least a portion of one layer of the computer-generated perceptual information marking device is removed to change the presented design elements.

* * * * *